March 7, 1944.    E. F. W. ALEXANDERSON    2,343,628
CONTROL CIRCUIT FOR ELECTRIC VALVE APPARATUS
Filed Sept. 12, 1941

Inventor:
Ernst F.W. Alexanderson,
by Harry E. Dunham
His Attorney.

Patented Mar. 7, 1944

2,343,628

UNITED STATES PATENT OFFICE 2,343,628

CONTROL CIRCUIT FOR ELECTRIC VALVE APPARATUS

Ernst F. W. Alexanderson, Schenectady, N. Y., assignor to General Electric Company, a corporation of New York Application September 12, 1941, Serial No. 410,514

9 Claims. (Cl. 175—363)

My invention relates to control circuits for electric valve apparatus, and more particularly to control or excitation circuits for electric valve means of the type employing control members of the immersion-ignitor type.

Due to the large current-carrying capacity of electric valve means employing self-reconstructing type cathodes, such as mercury pool cathodes, electric valve apparatus of the type employing immersion-ignitor control members has found a rather wide field of application. Heretofore, many of the control or excitation circuits devised for the control of the energization of the control members have been of rather complicated construction and arrangement and have been relatively expensive to manufacture. In accordance with the teachings of my invention described hereinafter, I provide new and improved excitation circuits for electric valves employing immersion ignitor type control members or electrodes, and which afford simplicity of construction without sacrificing the desired precision of control and operation of the electric valve means.

It is an object of my invention to provide new and improved control or excitation circuits for electric valve means.

It is another object of my invention to provide new and improved control or excitation circuits for electric valve means of the type employing an ionizable medium and comprising immersion-ignitor control members.

Briefly stated, in the illustrated embodiments of my invention I provide new and improved excitation circuits for transmitting to the immersion-ignitor control members of electric valve apparatus positive impulses of current to render the electric valve means conducting at a predetermined time during a cycle of applied anode-cathode voltage. The excitation circuit comprises a saturable inductive device, and the circuit is arranged to utilize certain characteristics of the immersion-ignitor control member to obtain the desired selective control of the magnetization of the saturable device so that positive impulses are provided during only half cycles of voltage of predetermined polarity.

Figure 1:
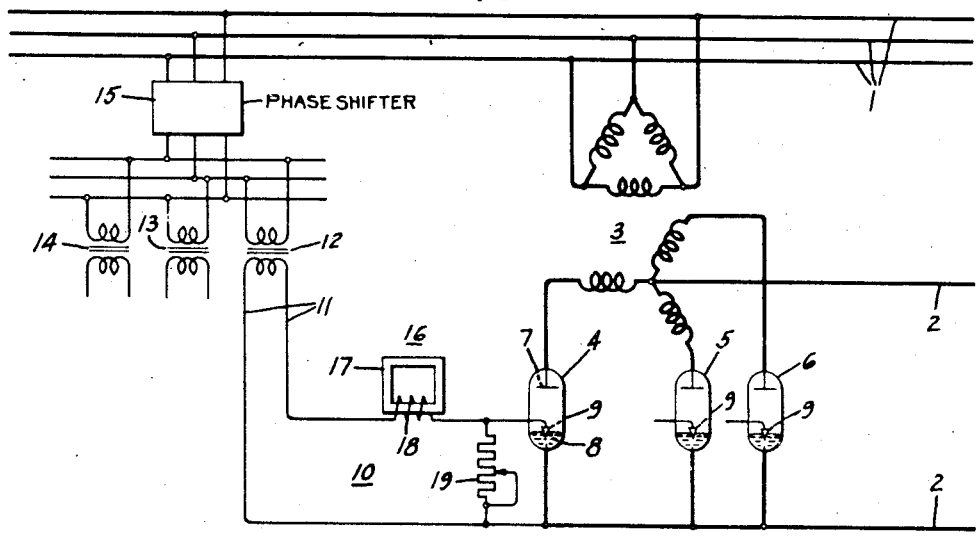
Figure 2:
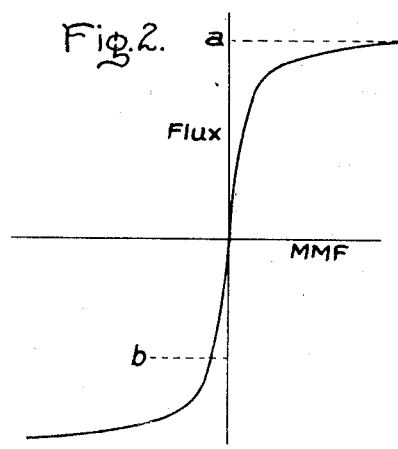
Figure 3:
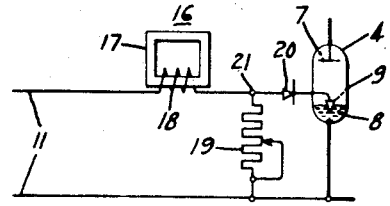
Figure 4:
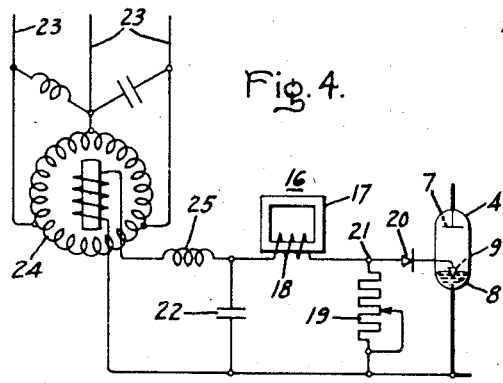
Figure 5:
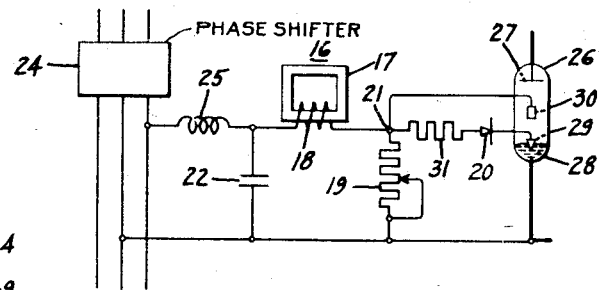

For a better understanding of my invention, reference may be had to the following description taken in connection with the accompanying drawing, and its scope will be pointed out in the appended claims. Fig. 1 diagrammatically illustrates an embodiment of my invention as applied to a polyphase rectifying circuit and Fig. 2 represents certain operating characteristics thereof. Figs. 3, 4 and 5 are modifications of the arrangement shown in Fig. 1.

Referring now to Fig. 1 of the drawing, my invention is there illustrated as applied to a polyphase rectifying system for transmitting power from a polyphase alternating current supply circuit 1 to a direct current load circuit 2 through electric translating apparatus comprising a transformer 3 and a plurality of electric valve means 4, 5 and 6. The electric valve means 4, 5 and 6 are of the type employing an ionizable medium, such as a gas or a vapor, and each includes an anode 7, a cathode 8 of the self-reconstructing type such as a mercury pool cathode, and an immersion-ignitor control member 9 having an extremity thereof extending into the cathode 8. The immersion-ignitor control members 9 are preferably constructed of a material, such as boron carbide or silicon carbide, having an electrical resistivity which is relatively large compared with that of the associated mercury and which, upon the transmission of a predetermined minimum critical value of current therethrough, establish cathode spots on the associated cathodes and initiate arc discharges between the associated anodes 7 and cathodes 8.

I provide a plurality of excitation circuits for energizing the control members 9 of electric valve means 4, 5 and 6. For the purpose of simplifying the presentation of my invention, only excitation circuit 10 associated with electric valve means 4 is shown. It will be understood that in practice similar excitation circuits are also connected to control members 9 of electric valve means 5 and 6. The excitation circuit 10 is energized from a suitable source of alternating current 11 which may be supplied by transformer 12. Transformers 13 and 14 may be provided for energizing excitation circuits for electric valve means 5 and 6. The phase of the alternating voltages supplied to the excitation circuits for electric valve means 4, 5 and 6 may be adjustable. If desired, the excitation circuits may be energized from the alternating current supply circuit 1 through a phase shifting circuit or device 15.

I have found that when an alternating voltage is impressed across the cathode 8 and immersion-ignitor control member 9 of electric valve means of this type that there is an unsymmetrical flow of current during the positive and negative half cycles. That is, when the control member 9 is positive in potential relative to cathode 8, such as the condition which exists during the positive half cycles of applied voltage, the current which tends to flow in the connected circuit is substantially greater than the current which flows when the cathode 8 is positive in potential relative to control member 9. The difference in current is due to the fact that when the control member 9 is positive in potential relative to cathode 8, a cathode spot is more easily established on the surface of the mercury than when current is transmitted in the reverse direction from the cathode 8 to the control member 9. I utilize this unsymmetrical impedance to the flow of alternating current in the production of a voltage of peaked wave form which effects the transmission of an impulse of positive current to the immersion-ignitor control members 9. I provide a saturable inductive device 16 having a saturable magnetic core member 17 and a winding 18. In series relation with the winding 18 I connect a suitable impedance element such as a resistance 19. The resistance 19 and winding 18 are connected in series relation across the source of alternating current 11. If desired, I may employ an inductance in place of resistance 19. The value of resistance 19 is critical. The resistance 19 is adjusted to have that value which during negative half cycles of the voltage of source 11 limits the current which is transmitted through the winding 18 to a value which prevents saturation of the core member 17 of inductive device 16. Of course, during the negative half cycles of voltage of source 11, an additional component of current is transmitted through the winding 18 by virtue of the circuit including cathode 8 and control member 9. The total current or the sum of the currents transmitted between the cathode 8 and control member 9 and the current transmitted through resistance 19 during the negative half cycles is not sufficient to cause saturation of core member 17. The resistance 19 is adjusted, however, so that during the positive half cycles of voltage of source 11 the current conducted by resistance 19 combined with the current transmitted through control member 9 and cathode 8 is sufficient to produce substantial saturation of the core member 17 of inductive device 16. As stated above, it will be appreciated that during the positive half cycles of voltage of source 11, the component of current which is transmitted through the circuit including control member 9 and cathode 8 is substantially greater than that transmitted during negative half cycles, and it is this difference in current which I employ to control selectively the magnetization of the saturable inductive device 16 to produce the positive impulses of voltage and current for energizing the control member 9 at the desired time during the positive half cycles of applied anode-cathode voltage.

Core member 17 of the saturable inductive device 16 is preferably constructed of a magnetic material which has a sharp bend in the magnetization curve. By virtue of this abrupt change in the magnetization curve, it is possible to utilize to great advantage the difference in current transmitted between control member 9 and cathode 8 during positive and negative half cycles in the production of the voltage of peaked wave form. The curve shown in Fig. 2 illustrates the magnetization curve of the core member 17 of the inductive device 16. During positive half cycles of voltage of source 11, the core member 17 is operated well above the knee of the curve, that is, within the region a, and during the negative half cycles of the voltage of source 11 the core member 17 is operated somewhat below the bend or knee of the saturation curve within the region b.

The operation of the embodiment of my invention illustrated in Fig. 1 will be explained by considering the system when it is operating as a rectifier. It will be appreciated that the electric valve means 4, 5 and 6 conduct current in a predetermined order determined by the order of phase rotation, and that the excitation circuits for the respective electric valve means transmit impulses of current to the associated control members 9 to render the valves conducting at desired times during the respective positive half cycles of applied anode-cathode voltage. The phase shifting device 15 may be controlled or adjusted to control the time of occurrence of the positive impulse of voltage transmitted to control member 9 and, hence, control the magnitude of voltage impressed across the load circuit 2.

The excitation circuits, of which excitation circuit 10 is exemplary, generate positive impulses of voltage which effect the transmission of positive impulses of current to the immersion-ignitor control members 9. Considering excitation circuit 10 in particular, during the positive half cycles of voltage of the associated source 11, the inductive device 16 becomes saturated, effectively and abruptly reducing the inductive reactance of the winding 18 and effecting the transmission of an impulse of current to the immersion-ignitor control member 9. Of course, the impulse of current transmitted through the excitation circuit by virtue of the saturation of the device 16 causes an abrupt rise in voltage across resistance 19. The core member 17 of the device 16 is exclusively controlled by the current which flows in the excitation circuit. The unsymmetrical impedance of the control member 9 and cathode 8 causes an unsymmetrical flow of current during the positive and negative half cycles of the voltage of source 11, thereby selectively increasing the magnetization of core member 17 during the positive half cycles.

One function of the resistance 19 is to regulate the degree of unsymmetrical saturation of core member 17. As the magnitude of resistance 19 is increased, a point is reached at which excitation circuit 10 becomes inoperative in the sense that an impulse of voltage will not be produced due to the necessity of transmitting a predetermined minimum current through winding 18 to effect saturation of core member 17. If the value of resistance 19 is too small or if resistance 19 is short-circuited, the swing of the flux in core member 17 becomes symmetrical and the impulses of voltage produced become smaller or completely disappear. The correct value for resistance 19 is determined by increasing the value of the resistance until the unidirectional impulses have reached that intensity at which positive ignition of the associated electric valve means is obtained.

In Fig. 3 I have illustrated diagrammatically another embodiment of my invention which is similar in many respects to that illustrated in Fig. 1, and corresponding elements have been assigned like reference numerals. In the arrangement of Fig. 3, in order to accentuate the unsymmetrical impedance of the circuit connected to the immersion-ignitor control member 9 and cathode 8 and to assure the transmission of only positive impulses of current to control member 9, I connect in series relation with the control member 9 a unidirectional conducting device 20. The unidirectional conducting device 20 is connected between the common juncture 21 of winding 18 and resistance 19. The employment of unidirectional conducting device 20 not only accentuates or increases the difference in the currents transmitted during the positive and negative half cycles of the voltage of source 11 but also increases the efficiency of the excitation circuit.

The operation of the embodiment illustrated in Fig. 3 is substantially the same as that explained above in connection with Fig. 1. During the positive half cycle of the voltage of source 11, substantial current flows through the circuit including unidirectional conducting device 20, control member 9 and cathode 8, and this current when combined with the current transmitted through resistance 19 effects substantial saturation of the magnetic core member 17, thereby producing an impulse of voltage and current for energizing the control member 9. During the negative half cycles, due to the connection of the unidirectional conducting device 20, the current transmitted through winding 18 is substantially less than that transmitted therethrough during the positive half cycles and the core member 17 is not saturated; consequently, no impulse of voltage is produced.

In many power applications it is desirable to reduce as much as possible the application of pulsating loads to an associated supply circuit. In the embodiment of my invention illustrated in Fig. 4, I provide an arrangement whereby the excitation circuit does not reflect to the associated supply circuit the sharp impulse of current required for the energization of the ignitor control member. More particularly, I provide a capacitance 22 which is charged from a suitable source of alternating current 23 through a phase shifting device 24 and a smoothing inductance or reactance 25. By virtue of the connection of capacitance 22 and the inductance 25 between the source, impulses of positive current are transmitted to the control member 9 without imposing the peak load impulses on the associated supply. The arrangement of Fig. 4 offers another advantage in that the excitation circuit may be operated from a source or power supply of relatively small capacity without appreciably disturbing the voltage or power factor conditions of the supply. Where it is desired to use a phase shifting device or means between the supply circuit and the excitation circuit, it will be appreciated that the phase shifting means may offer appreciable impedance or reactance. In such cases, if the reactance of the phase shifting means is too great it would be difficult to provide the necessary impulse of current. The provision of capacitance 22 which may be charged during a substantial portion of the cycle of the voltage of the associated source permits operation of the system by the gradual charging of the capacitance, and subsequent discharge of the capacitance at the desired time in the cycle when the inductive reactance of winding 18 decreases abruptly due to the saturation of core member 17.

The embodiment of my invention shown in Fig. 4 operates to transmit an impulse of current to the control member 9 during each positive half cycle of the source. The capacitance 22 is slowly charged from circuit 23 through smoothing inductance 25. Prior to the time at which the core member 17 saturates, the inductive reactance 18 is relatively large. As the current increases during the positive half cycle, the current through winding 18 eventually reaches a value which causes substantial saturation of core member 17 effecting an abrupt decrease in the inductive reactance of winding 18 and consequently effecting discharge of capacitance 22 through a circuit including winding 18, unidirectional conducting device 20, control member 9 and cathode 8. The capacitance 20 does not discharge through the circuit including inductance 25 because this inductance is designed to have an impedance which is relatively large compared to that of the last described circuit. During the negative half cycles of the voltage of the source, the current transmitted through the winding 18 is maintained below the value which effects substantial saturation of the core member and, hence, impulses of voltage are not produced.

Fig. 5 diagrammatically represents a modification of the arrangement shown in Fig. 4. The electric valve means 26 shown in Fig. 4 is also preferably of the type employing an ionizable medium, such as a gas or a vapor, and includes an anode 27, a mercury-pool cathode 28, an immersion-ignitor type control member 29 and a transfer or relieving anode 30. Other elements of the system are assigned reference numerals corresponding to the elements shown in Fig. 4. In order to effect the transfer of excitation current to the relieving anode 30, as soon as an arc discharge is established within the electric valve means 26, a transfer resistance 31 may be connected in series relation with unidirectional conducting device 20 and connected to the common juncture 21.

The excitation circuit shown in Fig. 5 operates substantially as that explained above in connection with Fig. 4. Due to the presence of the relieving anode 30 and transfer resistance 31, as soon as an arc discharge is established within the electric valve means the flow of current through resistance 31 raises the potential of the anode 30 so that the excitation current is transferred from control member 29 to the relieving anode 30.

An important advantage of the embodiments of my invention described above is the fact that the selective control of the magnetization of the self-saturable inductive devices is obtained by employing characteristics of the associated circuit and electric valve means. Furthermore, the unsymmetrical saturation of the inductive device is determined exclusively by the excitation current which flows in the excitation circuit. These features not only permit reduction in manufacturing costs but also permit application of the excitation system to that type of electric valve translating apparatus where it is necessary to maintain each of the excitation circuits at different potentials. Since each excitation circuit is relatively simple in construction and arrangement, and inasmuch as it is not necessary to interconnect it with the other excitation circuits except through the ordinary excitation transformers and phase shifting arrangements, excitation systems of this nature offer many advantages not afforded by the prior art arrangements.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric discharge device of the type employing an ionizable medium and comprising an anode, a cathode and an immersion-ignitor control member associated with said cathode, said cathode and said control member offering an unsymmetrical impedance to the flow of alternating current therethrough, a source of alternating current, and an excitation circuit for energizing said control member and including a self-saturable inductive device having a saturable core member and a winding, an impedance connected in series relation with said winding across said source, the magnitude of said impedance and the control-member-to-cathode circuit being such that the unsymmetrical current transmitted through said winding during positive and negative half cycles of voltage of said source effects saturation of said core member during only positive half cycles of voltage of said source thereby effecting the transmission of positive impulses of current to said control member sufficient to initiate arc discharges between said anode and said cathode during only said positive half cycles.

2. In combination, an electric discharge device of the type employing an ionizable medium and comprising an anode, a cathode and an immersion-ignitor control member associated with said cathode, a source of alternating current, and an excitation circuit for energizing said control member including a self-saturable inductive device having a core member and a winding, and an impedance connected in series relation with said winding across said source, said impedance being of a value which limits the current transmitted through said winding during half cycles of voltage of one polarity of said source to a value insufficient to cause saturation of said device and of a value which permits the transmission of sufficient current through said winding during half cycles of voltage of opposite polarity so that the combined currents conducted by said impedance and said control member cause saturation of said core member and effect the transmission of an impulse of positive current to said control member sufficient in magnitude to initiate an arc discharge between said anode and said cathode.

3. In combination, an electric discharge device employing an ionizable medium and comprising an anode, a cathode and an immersion-ignitor control member associated with said cathode, a source of alternating current, and an excitation circuit for energizing said control member including a self-saturable inductive device having a saturable core member and a winding and an impedance connected in series relation with said winding across said source, said impedance element being of a value which prevents substantial saturation of said core member during negative half cycles of voltage of said source and which transmits sufficient current during the positive half cycles so that the current transmitted thereby and the current transmitted through said control member are of sufficient value to cause substantial saturation of said core member and to effect thereby the generation of an impulse of voltage sufficient to establish an arc discharge between said anode and cathode.

4. In combination, an electric discharge device of the type employing an ionizable medium and comprising an anode, a cathode and an immersion-ignitor control member associated with said cathode, a source of alternating current, and an excitation circuit for energizing said control member including a self-saturable inductive device having a saturable core member and a winding and an impedance connected across said control member and said cathode, said impedance being of a value which limits the current transmitted through said winding during the negative half cycles of voltage of said source to a value insufficient to cause saturation of said core member and of a value which permits the transmission of sufficient current through said winding during the positive half cycles of voltage so that the combined currents conducted by said impedance and said control member cause substantial saturation of said core member and effect thereby the transmission of impulses of positive current to said control member sufficient in magnitude to initiate arc discharges between said anode and said cathode.

5. In combination, an electric discharge device of the type employing an ionizable medium and comprising an anode, a self-reconstructing type cathode and an immersion-ignitor control member having an extremity thereof extending into said cathode, said control member and said cathode offering an unsymmetrical effective resistance to the flow of positive and negative current between said control member and said cathode, a source of alternating current, and an excitation circuit for energizing said control member including a self-saturable inductive device having a saturable core member and a winding and an impedance connected in series relation with said winding across said source, said impedance being of a value such that the total of the current transmitted therethrough and the current transmitted from said cathode to said control member during the negative half cycles of voltage of said source is of a value insufficient to effect substantial saturation of said core member and which transmits a current of sufficient value which when combined with the current flowing through said control member and said cathode during the positive half cycles of voltage of said source is sufficient to cause saturation of said core member and to effect the transmission of an impulse of positive current to said control member thereby initiating an arc discharge between said anode and said cathode.

6. In combination, an electric discharge device of the type employing an ionizable medium and comprising an anode, a cathode and an immersion-ignitor control member associated with said cathode, a source of alternating current, and an excitation circuit for transmitting positive impulses of current to said control member and including a self-saturable inductive device having a saturable magnetic core member and a winding, a unidirectional conducting device connected in series relation with said control member and means exclusive of said unidirectional conducting device and said control member comprising an impedance connected in series relation with said winding across said source, the value of said impedance being such that the unsymmetrical flow of current between said control member and said cathode effecting substantial saturation of said core member during only positive half cycles of voltage of said source thereby effecting the transmission of positive impulses of current to said control member during only the positive half cycles.

7. In combination, an electric discharge device of the type employing an ionizable medium and comprising an anode, a cathode and an immersion-ignitor control member associated with said cathode, a source of alternating current, and an excitation circuit for energizing said control member and comprising a self-saturable inductive device having a saturable core member and a winding, a resistance connected in series relation with said winding across said source, a unidirectional conducting device connected between said control member and the common juncture of said resistance and said winding, said unidirectional conducting device serving to effect the transmission of a greater amount of current through said winding during the positive half cycles of voltage of said source than during the negative half cycles thereby effecting the generation of positive impulses of voltage across said resistance during said positive half cycles, the value of said impedance being such that the core of said device is substantially unsaturated during said negative half cycles.

8. In combination, an electric discharge device of the type employing an ionizable medium and comprising an anode, a cathode and a control member of the immersion-ignitor type associated with said cathode, a source of alternating current, and an excitation circuit for energizing said control member comprising a capacitance connected to be charged from said source, a self-saturable inductive device having a saturable magnetic core member and a winding, an impedance connected in series relation with said winding across said capacitance and a unidirectional conducting device connected in series relation with said control member, said unidirectional conducting device by virtue of its unsymmetrical impedance during positive and negative half cycles of voltage of said source effecting the transmission of a substantially greater current through said winding during positive half cycles of voltage than during the negative half cycles of voltage of said source thereby producing positive impulses of voltage across said impedance element during only the positive half cycles, the value of said impedance being such that the core of said device is substantially unsaturated during said negative half cycles.

9. In combination, an electric discharge device of the type employing an ionizable medium and comprising an anode, a cathode and a control member of the immersion-ignitor type associated with said cathode, a source of alternating current, and an excitation circuit for energizing said control member comprising a capacitance connected to be charged from said source, a self-saturating inductive device having a saturable magnetic core member and a winding, an impedance connected in series relation with said winding across said capacitance and a unidirectional conducting device connected in series relation with said control member, said unidirectional conducting device being poled to transmit substantial current during only the positive half cycles of said source thereby effecting substantial saturation of said core member during the positive half cycles and effecting discharge of said capacitance during said positive half cycles to impress positive impulses of voltage on said control member, the value of said impedance being such that the core of said device is substantially unsaturated during the negative half cycles.

ERNST F. W. ALEXANDERSON.